US010080973B1

(12) United States Patent
Pieron et al.

(10) Patent No.: US 10,080,973 B1
(45) Date of Patent: *Sep. 25, 2018

(54) PLACEHOLDER ITEMS THAT CAN BE EXCHANGED FOR AN ITEM OF VALUE BASED ON USER PERFORMANCE

(71) Applicant: Kabam, Inc., San Francisco, CA (US)

(72) Inventors: Luc Pieron, San Francisco, CA (US); Henry Rull, San Francisco, CA (US); Kevin Simmons, San Francisco, CA (US); Sam McLellan, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,525

(22) Filed: May 10, 2018

Related U.S. Application Data

(63) Continuation of application No. 15/782,079, filed on Oct. 12, 2017, now Pat. No. 9,968,854, which is a continuation of application No. 15/463,346, filed on Mar. 20, 2017, now Pat. No. 9,789,407, which is a continuation of application No. 14/231,574, filed on Mar. 31, 2014, now Pat. No. 9,610,503.

(51) Int. Cl.
| | |
|---|---|
| *A63F 13/798* | (2014.01) |
| *A63F 13/69* | (2014.01) |
| *A63F 13/35* | (2014.01) |
| *A63F 13/79* | (2014.01) |
| *A63F 13/67* | (2014.01) |

(52) U.S. Cl.
CPC ............ *A63F 13/798* (2014.09); *A63F 13/35* (2014.09); *A63F 13/69* (2014.09); *A63F 13/67* (2014.09); *A63F 13/79* (2014.09)

(58) Field of Classification Search
CPC .......... A63F 13/35; A63F 13/67; A63F 13/69; A63F 13/79; A63F 13/798
See application file for complete search history.

(56) References Cited

U.S. PATENT DOCUMENTS

| | | | | |
|---|---|---|---|---|
| 8,843,557 | B2 * | 9/2014 | Ranade | G06Q 50/01 709/204 |
| 8,961,319 | B1 * | 2/2015 | Pieron | G07F 17/3281 463/42 |
| 9,007,189 | B1 * | 4/2015 | Curtis | A63F 13/798 340/323 R |
| 9,259,642 | B1 * | 2/2016 | McNeill | A63F 13/822 |
| 9,317,993 | B2 * | 4/2016 | Hardy | G07F 17/32 |
| 9,375,636 | B1 * | 6/2016 | Wakeford | A63F 13/00 |
| 9,403,093 | B2 * | 8/2016 | Harrington | A63F 13/795 |
| 9,406,201 | B2 * | 8/2016 | Englman | G07F 17/3223 |
| 9,452,356 | B1 * | 9/2016 | Tsao | A63F 13/12 |
| 9,452,364 | B1 * | 9/2016 | Curtis | A63F 13/12 |
| 9,463,376 | B1 * | 10/2016 | Kim | A63F 13/00 |
| 9,468,851 | B1 * | 10/2016 | Pieron | G07F 17/3281 |
| 9,610,503 | B2 * | 4/2017 | Pieron | A63F 13/79 |
| 9,626,475 | B1 * | 4/2017 | Schultz | G06F 17/608 |
| 9,656,174 | B1 * | 5/2017 | McLellan | A63F 13/792 |

(Continued)

*Primary Examiner* — William H McCulloch, Jr.
(74) *Attorney, Agent, or Firm* — Sheppard Mullin Richter & Hampton LLP

(57) ABSTRACT

Systems and methods for online gaming including virtual placeholder items that can be exchanged for virtual items of value based on a quantitative performance of the users relative to other users in events that take place in the online game.

19 Claims, 5 Drawing Sheets

(56) References Cited

U.S. PATENT DOCUMENTS

| | | | |
|---|---|---|---|
| 9,669,313 B2* | 6/2017 | Pieron | G07F 17/3281 |
| 9,682,314 B2* | 6/2017 | Kim | A63F 13/00 |
| 9,782,677 B1* | 10/2017 | Topkins | A63F 13/45 |
| 9,789,407 B1* | 10/2017 | Pieron | A63F 13/79 |
| 9,795,885 B1* | 10/2017 | Kim | A63F 13/792 |
| 9,968,854 B1* | 5/2018 | Pieron | A63F 13/79 |
| 9,975,050 B1* | 5/2018 | Pieron | A63F 13/12 |
| 9,978,211 B1* | 5/2018 | Schultz | G06F 17/608 |
| 2007/0233585 A1* | 10/2007 | Ben Simon | G06Q 40/00 705/35 |
| 2010/0041472 A1* | 2/2010 | Gagner | G07F 17/3258 463/26 |
| 2010/0227682 A1* | 9/2010 | Reville | A63F 13/12 463/29 |
| 2012/0129590 A1* | 5/2012 | Morrisroe | A63F 13/65 463/25 |
| 2014/0206449 A1* | 7/2014 | Alman | A63F 13/61 463/31 |
| 2014/0274359 A1* | 9/2014 | Helava | A63F 13/00 463/29 |
| 2015/0031440 A1* | 1/2015 | Desanti | A63F 13/69 463/25 |
| 2015/0273320 A1* | 10/2015 | Pieron | A63F 13/79 463/25 |
| 2015/0306494 A1* | 10/2015 | Pieron | A63F 13/69 463/31 |
| 2015/0335995 A1* | 11/2015 | McLellan | A63F 13/12 463/25 |
| 2015/0352436 A1* | 12/2015 | Pieron | A63F 13/12 463/25 |
| 2016/0121219 A1* | 5/2016 | Kim | A63F 13/00 463/25 |
| 2016/0236094 A1* | 8/2016 | Pieron | A63F 13/798 |
| 2016/0361654 A1* | 12/2016 | Pieron | G07F 17/3281 |
| 2018/0065042 A1* | 3/2018 | McLellan | A63F 13/55 |

* cited by examiner

You just purchased placeholder items that can be exchanged for virtual items of value based on your performance!

Here is the payout schedule:

1st place: *All placeholder items will be exchanged for Premium Item "A"*

2nd place: *All placeholder items will be exchanged for Premium Item "B"*

3rd place: *All placeholder items will be exchanged for Premium Item "C"*

5-10th place: *All placeholder items will be exchanged for Non-Premium Item "D"*

<10th place: *No exchange*

FIG. 4

PLACEHOLDER ITEMS THAT CAN BE EXCHANGED FOR AN ITEM OF VALUE BASED ON USER PERFORMANCE

FIELD OF THE DISCLOSURE

This disclosure relates to online gaming that includes virtual placeholders items that can be exchanged for virtual items of value based on a quantitative performance of users in the online game.

BACKGROUND

Users may access virtual spaces via client computing platforms. A virtual space may include, for example, an online game. A virtual space may include virtual items that are available for use by the users of the virtual space. Virtual items may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods. Events may take place in the online game, such as a tournament. Users may be awarded virtual items based on their performance in the events.

SUMMARY

User participation in online game events (e.g., tournaments, battles, challenges, etc.) may be driven by the opportunity to obtain awards based on performance in the event (e.g., awarding users for placing $1^{st}$, $2^{nd}$ and/or $3^{rd}$). Users may lose interest and/or may become less engaged in an event if they do not believe they are going to place high enough to obtain such awards. As such, one aspect of the disclosure relates to a system for online gaming including virtual placeholder items that can be exchanged for virtual items of value based on user performance in the online game (e.g., in an event). The exchange may be separate from, or in addition to, the distribution of awards associated with an event. Placeholder items included in a user's inventory of virtual items may be exchanged for virtual items of value even if users do not place high enough in an event to receive an award. Therefore user engagement may be enhanced by the opportunity to exchange placeholder items for virtual items of value based on user performance even if the user does not believe they will win or at least place in the event.

In some implementations, the system may comprise one or more physical processors configured to execute one or more computer components for implementing an instance of a virtual space and/or an online game taking place within the virtual space and to facilitate the participation of one or more users in the virtual space and/or the online game. The computer program components may include one or more of a game component, a user component, a virtual shop component, an exchange component and/or other components.

The game component may be configured to execute an instance of an online game. The online game may take place in a virtual space. The game component may be configured to implement the instance of the online game to facilitate user participation in the online game. Users may participate with the online game by controlling game entities in the virtual space. Events in the online game include one or more of a tournament, match, campaign, battle, siege, and/or other considerations of gameplay events where performance relative to other users may be quantitatively measured.

The user component may be configured to manage virtual item inventories associated with the users in the online game. The inventories may include one or more virtual items available for the users in the online game. The inventories may include placeholder items and virtual items of value. In some implementations, the user component may be configured to manage a first inventory of one or more virtual items available for a first user and a second inventory of one or more virtual items available for a second user.

The virtual shop component may be configured to effectuate presentation of offers to sell virtual items to users for consideration through a shop interface. The offers may include offers to sell virtual items of value that are usable in the online game, sets of virtual items of value, and/or placeholder items which can be exchanged for virtual items of value based on user performance. The virtual shop component may be configured to manage the transfer of virtual items to user inventories in response to purchase of the virtual items. For example, responsive to the purchase of a first placeholder item by the first user, the virtual shop component may be configured to manage the transfer the first placeholder item to the first inventory of the first user.

The exchange component may be configured to exchange the placeholder items included in the user inventories for virtual items of value that are usable in the online game based on a quantitative performance of the users relative to other users in events that take place in the online game. Quantitative performance may correspond to a rank achieved through gameplay in one or more events. A rank may include, for example, a position, a placement, a status, a level, an acquisition, and/or other consideration of a quantitative measure of performance achieved through gameplay. For example, subsequent to a first event in the online game, the first placeholder item may be exchanged in the first inventory of the first user for a first set of one or more virtual items determined based on quantitative performance of the first user in the first event relative to other users of the online game.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates an implementation of a user interface depicting a payout schedule for placeholder items based on the qualitative performance of the users relative to other users in events taking place in the virtual space.

DETAILED DESCRIPTION

Figure 1:
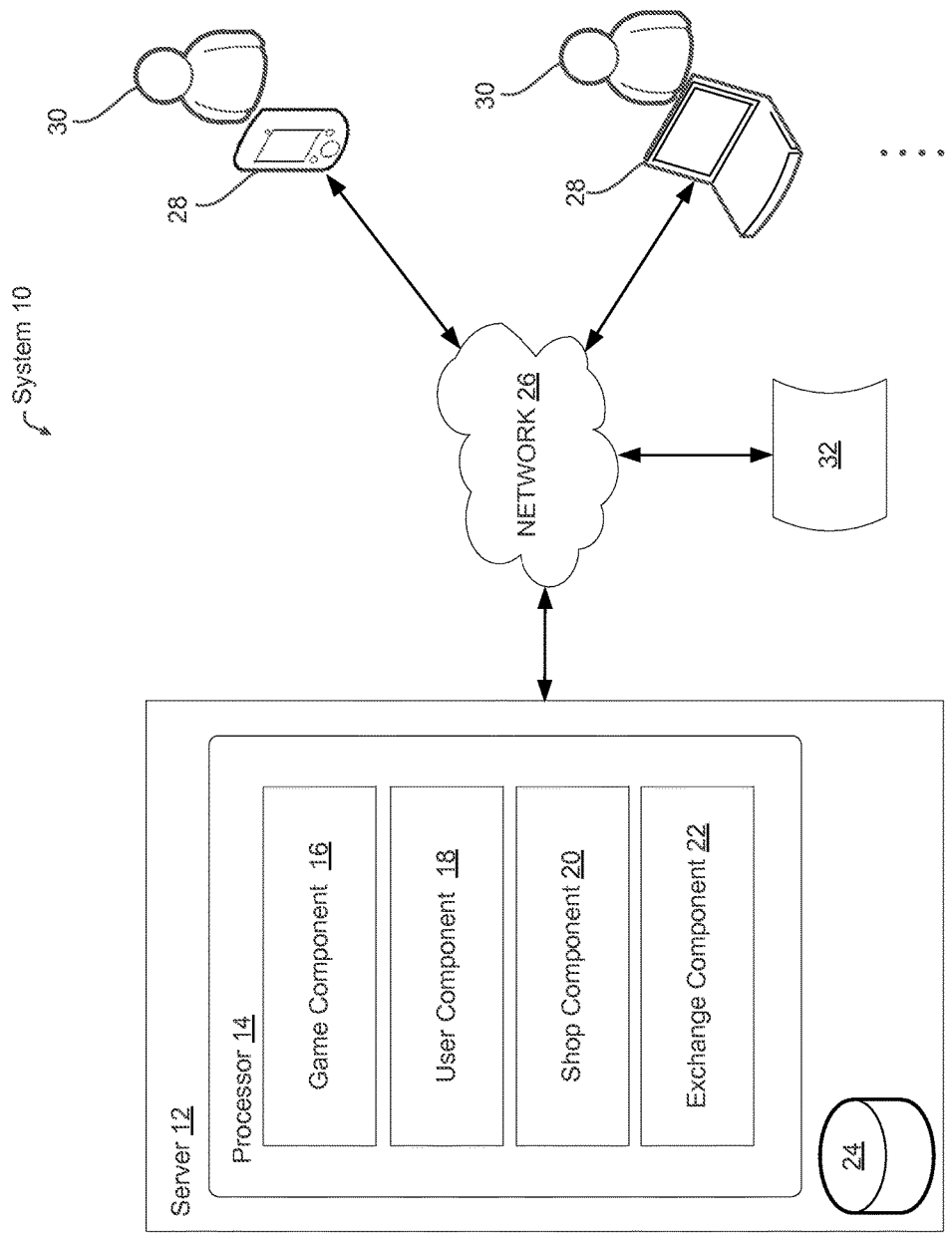
FIG. 1 illustrates a system for online gaming including virtual placeholder items that can be exchanged for virtual items of value based on the quantitative performance of the users relative to other users in events that take place in virtual space.

FIG. 1 illustrates a system 10 for online gaming including virtual placeholder items which can be exchanged for virtual items of value based on a quantitative performance of a user relative to other users in events that take place in the online game. The online game may take place within a virtual space. Users may participate with the virtual space and/or the online game by controlling game entities in the virtual space. Game entities may include one or more of a virtual character, group of characters, an object, a battalion, a clan, a unit, a village, an army, and/or other considerations. Events in the online game include one or more of a tournament, match, campaign, battle, siege, and/or other considerations of gameplay events where performance relative to other users may be quantitatively measured.

The virtual space may include a virtual shop configured to present offers to sell virtual items to users. Offers to sell virtual items may include offers to sell virtual items of value that can be used in the virtual space and/or online game, virtual placeholder items that can be exchanged for virtual items of value, and/or combinations thereof. In some implementations, offers to sell virtual placeholder items may be associated with offers to sell a set of virtual items of value wherein the offer includes one or more virtual placeholder items included in the set as a promotion (e.g., for no additional charge). In some implementations, virtual items of value and/or virtual placeholder items may be acquired by users through other techniques, for example through gameplay, by chance, and/or considerations.

Virtual items may include one or more of a virtual weapon, a tool, a food, a currency, a reward, a bonus, health, a potion, an enhancement, a placeholder item, a mount, a power-up, a speed-up, clothing, a vehicle, an anatomical feature of a character or game entity, a troop or troop type, a pet, a virtual resource, and/or other virtual items and/or goods. Some virtual items may have value and provide utility in the virtual space insofar as the items may be usable within the virtual space and/or the online game that takes place in the virtual space. Utility may include, for example, a boost of an attribute of a game entity controlled by a user in the virtual space. Placeholder items may provide no utility in the virtual space. Placeholder items may only be "used" in an exchange of the placeholder items for virtual items that do provide utility and are usable in the online game (e.g., a sword may be used in the game to defeat an enemy). The placeholder items may be exchanged based on a quantitative performance of a user relative to other users in events that take place in the virtual space and/or online game. Placeholder items may otherwise be considered "value-less" until a quantitative performance value can be determined and/or otherwise obtained to facilitate such an exchange. Any value attributed to a placeholder item may depend on the opportunity for potential exchange for a virtual item of value that is usable in the online game. Herein the term "virtual item of value" may refer to virtual items that provide utility in the online game.

In some implementations, virtual items of value may be categorized as one of a premium virtual item, non-premium virtual item, and/or other considerations. Premium virtual items may be virtual items of value that provide more utility in the online game (e.g., relative non-premium items), are of a higher value (e.g., relative non-premium items), and/or other considerations. Premium virtual items may be virtual items of value that are "rare" in the online game. For example, a "rare" virtual item of value may be a virtual item that can only be acquired through exchange of a placeholder item (e.g., and not through purchase via the virtual shop). Non-premium virtual items may be virtual items of value that provide less utility in the online game (e.g., relative premium items), are of a lower value (e.g., relative premium items), and/or other considerations. Non-premium virtual items may be virtual items of value that are "common" in the online game. For example, a "common" virtual item of value may be a virtual item that can be purchased through the virtual shop at a relatively low price.

In some implementations, the exchange of placeholder items with virtual items of value based on user performance in an event may be carried alternatively to, and/or simultaneously with, exiting awards distributed to users. For example, an event may award the winner a particular prize (e.g., a premium virtual item). The winner may also be able obtain additional virtual items of value via the exchange of any placeholder items included in the users inventory as described herein. In some implementations, non-winning users may obtain virtual items of value via the exchange of any placeholder items included in their inventory as described herein.

In FIG. 1, providing the virtual space may include hosting the virtual space over a network 26, such as the Internet. A host server may include one or more processors configured to execute one or more computer components for implementing an instance of a virtual space and/or an online game taking place within the virtual space and to facilitate the participation of one or more users in the virtual space and/or the online game. The host server may be a game server 12. The server 12 may include processor(s) 14.

The computer program components may include one or more of a game component 16, a user component 18, a virtual shop component 20, an exchange component 22, and/or other components. The server 12 may be configured to communicate with one or more client computing platforms 28, according to client/server architecture. The client computing platforms 28 can include, for example, a cellular telephone, a smartphone, a laptop, a tablet computer, a desktop computer, a television set-top box, smart TV, a gaming console, and/or other device as described herein and/or other considerations. The users 30 may access system 10 and/or the virtual space via client computing platforms 28.

The game component 16 may be configured to implement an instance of the virtual space executed by the computer components to determine state of the virtual space. The state may then be communicated (e.g., via streaming visual data, via object/position data, and/or other state information) from server 12 to client computing platforms 28 for presentation to users 30. The state determined and transmitted to a given client computing platform 28 may correspond to a view for a user character (or other game entity) being controlled by a user 30 via input devices (e.g., a controller) at the given client computing platform 28. The state determined and presented to a given client computing platform 28 may correspond to a location in the virtual space (e.g., location in the game). The view described by the state for the given client computing platform 28 may correspond, for example, to the location from which the view is taken, the location the view depicts, and/or other locations, a zoom ratio, a dimensionality of objects, a point-of-view, and/or view parameters of the view. One or more of the view parameters may be selectable by the users 30.

An instance of the virtual space may comprise a simulated space that is accessible by users 30 via clients (e.g., client computing platforms 28) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by game component 16 is not intended to be limiting. The game component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 16, users 30 may control game entities, simulated physical phenomena (e.g., wind, rain, earthquakes, and/or other phenomena), and/or other elements within the virtual space to interact with the virtual space and/or each other. The game entities may include virtual characters such as avatars. As used herein, the term game entity may refer to an object (or group of objects) present in the virtual space that represents an individual user. The game entity may be controlled by the user 30 with which it is associated. The user controlled element(s) may move through and interact with the virtual space (e.g., non-user characters in the virtual space, other objects in the virtual space). The user controlled elements controlled by and/or associated with a given user 30 may be created and/or customized by the given user. The user may have an "inventory" of virtual items and/or currency that the user can use (e.g., by manipulation of a user character or other user controlled element, and/or other items) within the virtual space.

The users may participate in the instance of the virtual space by controlling one or more of the available user controlled game entities in the virtual space. Control may be exercised through control inputs and/or commands input by the users through client computing platforms 28. The users may interact with each other through communications exchanged within the virtual space. Such communications may include one or more of textual chat, instant messages, private messages, voice communications, and/or other communications. Communications may be received and entered by the users 30 via their respective client computing platforms 28. Communications may be routed to and from the appropriate users through server 12 (e.g., through game component 16) and/or through communications which are external to the system 10 (e.g., text messaging services associated with the client computing platforms 28).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

The instance of the virtual space and/or online game may include events that take place in the virtual space. Events in the virtual space include one or more of a tournament, match, campaign, battle, siege, challenge, and/or other considerations of events. Events may correspond to gameplay where users control game entities and interact with other users controlling game entities, with artificial intelligence controlled entities, and/or other considerations of gameplay within the events. Participation in events may be monitored and/or otherwise determined such that the performance of users relative to other users in the events may be quantitatively valued. Quantitative performance may correspond to a rank achieved through gameplay in one or more events that take place in the virtual space. A rank may include, for example, a position, a placement, a status, a level, an acquisition, and/or other consideration of a quantitative measure of performance achieved through gameplay.

In some implementations, rank may refer to a user's performance relative to all other users of the virtual space. In some implementations, rank may refer to a user's performance relative to other users that have participated in a particular event taking place in the virtual space. In some embodiments, rank may refer to a user's performance relative to other users that are associated to the given user (e.g., via an alliance, clan, "friends" list, and/or other consideration of associations of users with other users). As an illustrative example, a rank may include a numerical measure, such as 3/10,000 (read as "third out of ten thousand"), $1^{st}$ place (e.g., for a particular event), $2^{nd}$ place (e.g., for a particular event), Level 10 warrior (e.g., a character rank), Level 2 warrior, and/or other considerations. In some implementations, rank may correspond to a level of the user and/or an entity controlled by the user in the virtual space. For example, users may start of an event as low level entity, such as a "Level 1 Grunt" (e.g., indicating a relatively low performance by the user). Users may upgrade to higher level entities through gameplay, for example to become a "Level 10 Captain" (e.g., indicating a high performance measure of the user).

Figure 2:
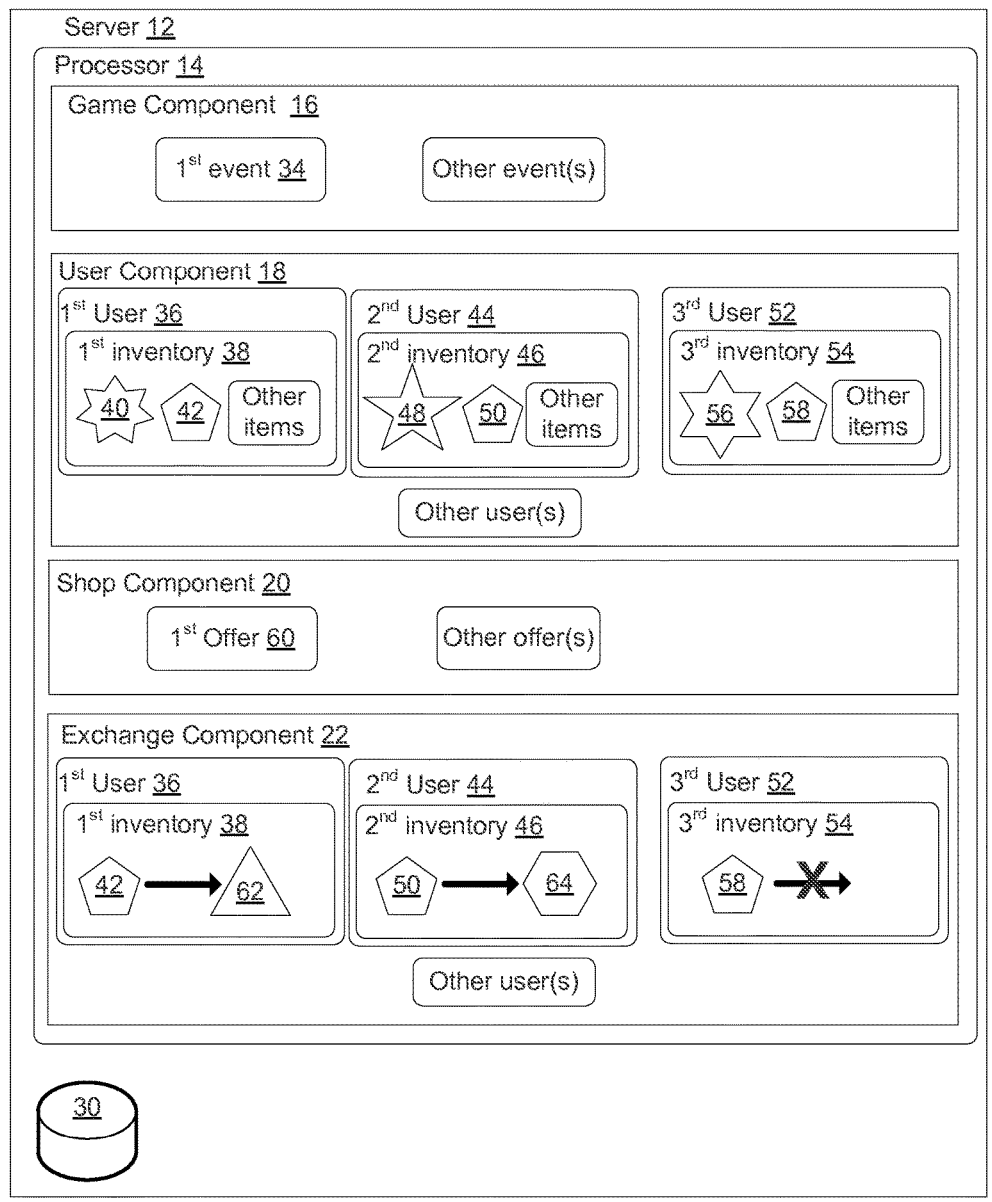
FIG. 2 illustrates a particular embodiment of the server employed in the system depicted in FIG. 1.

As an illustrative example in FIG. 2, the game component 16 may be configured to execute an instance of the virtual space and/or online game that includes a first event 34 that takes place in the virtual space and/or online game.

Returning to FIG. 1, the user component 18 may be configured to access and/or manage one or more user profiles and/or user information associated with users of the system 10. The one or more user profiles and/or user information may include information stored by server 12, one or more of the client computing platforms 28, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), virtual inventory information (e.g., virtual inventories associated with the users that include one or more virtual items available for the users in the virtual space), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

As an illustrative example in FIG. 2, the user component 18 may be configured to manage virtual item inventories including a first inventory 38 of one or more virtual items available for a first user 36, a second inventory 46 of one or more virtual items available for a second user 44, a third inventory 54 of one or more virtual items available for a third user 52, and/or other inventories associated with other users. The first inventory 38 may include, for example, a first virtual item 40 of value, a first placeholder item 42, and/or other items available for the first user 36. The second inventory 46 may include, for example, a second virtual item 48 of value, a second placeholder item 50, and/or other virtual items available for the second user 44. The third inventory 54 may include a third virtual item 56 of value, a third placeholder item 58, and/or other virtual items available for the third user 52.

Returning to FIG. 1, the virtual shop component 20 may be configured to present offers to sell instances of virtual items to users in a virtual shop. The virtual shop may be a simulated environment within the virtual space which is accessible by users and presents the views of the virtual shop to the users. Users may access the virtual shop through one of a variety of ways. Users may access the virtual shop through the manipulation of one or more entities associated with the user within the virtual space using control inputs and/or commands input by the users through client computing platforms 28, and/or other way of access.

Manipulation of an entity, such as a character, may include moving the one or more entities through the virtual space using control inputs and/or commands input by the users through client computing platforms 28, to move the one or more entities to the simulated environment designating the location of the virtual shop within the virtual space.

Users may use control inputs and/or commands not associated with the one or more entities to access the virtual shop. Control inputs and/or commands may automatically present the instance of the virtual shop on the clients computing platforms 28 (e.g., user selects a virtual shop button to automatically be taken to the virtual shop).

The instance of the virtual shop may be presented to users through a shop interface. The shop interface may be configured to present the offers to sell virtual items to users. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display the virtual items, and/or the one or more sets of virtual content available for purchase by the users. Users may view the virtual items (e.g., individual virtual items and/or sets of virtual items) available for purchase. Users may purchase the virtual items using virtual (or real) currency. Transactions may take place with the virtual teller, through various other actions of the user within the instance of the virtual shop, and/or other offer/transaction mechanisms. In some implementations, the virtual shop component 20 may be configured to manage transfer of instances of virtual items of value and instances of placeholder items to user inventories in response to purchase of the virtual items of value and placeholder items.

In some embodiments, offers to sell placeholder items may be presented to users prior to the start of an event taking place in the online game. For example, prior to the start of an event, users may be prompted (e.g., via a banner ad, in-game notification, external notification, and/or other consideration) to purchase one or more placeholder items (e.g., via the virtual shop). In some embodiments, offers to sell placeholder items may be presented to users during an event taking place in the online game. For example, at any time during an event (e.g., the start, the middle, the end, and/or at an intermediate time there between), the users may be prompted to purchase placeholder items. Offers may be presented in other ways.

As an illustrative example, in FIG. 2, the offers presented by the virtual shop component 20 may include a first offer 60 to sell one or more virtual items to the first user 36 (e.g., other users), and/or other offers to sell one or more virtual items to other users. For example, the first offer 60 may include an offer to sell a set of virtual items of value that includes the first placeholder item 42 included as a promotion (e.g., for no additional cost). However, in some implementations, the offers may include offers to sell placeholder items directly (e.g., the first placeholder item 42 sold directly to the first user 36). In some implementations, responsive to purchase of the set of virtual items of value including the first placeholder item 42 by the first user 36, the virtual shop component 20 may be configured to transfer the purchased set of virtual items of value and the first placeholder item 42 to the first inventory 38.

Returning to FIG. 1, the exchange component 22 may be configured to exchange the placeholder items included in the user inventories for virtual items that are usable in the online game based on a quantitative performance of the users relative to other users in events that take place in the online game. In some implementations, quantitative performance of the users in the events may correspond to a rank achieved by the users through participation in an event (e.g., and/or more than one event, for example, all events the user has participated in), and/or other considerations of performance. The higher the rank a given player achieves, the value of the virtual item that may be made available for exchange placeholder items with may increase. In some implementations, placeholder items may be exchanged based on a payout schedule (e.g., such as payout schedule 80 shown in the user interface 78 of FIG. 4). Placeholder items may be exchangeable with premium items of varying value, non-premium items of varying value, and/or other considerations of exchange based on the user's level of performance. For example, a high rank may be allow users to exchange placeholder items for premium virtual items of a high value, a lesser rank may allow users to exchange placeholder items for premium virtual items of lesser value, an even lesser rank may allow users to exchange placeholder items for non-premium items, and/or a threshold lowest rank may not allow any exchange of placeholder items.

In some implementations, placeholder items may be exchanged on a one-to-one basis. In other words, after an event wherein the user achieves a rank suitable to facilitate exchange of placeholder items, the user may be able to exchange each placeholder item included in their inventory for virtual item of value. In some implementations, placeholder items may be exchanged on a many-to-one basis, one-to-many basis, and/or may be exchanged based on other considerations.

Figure 3:
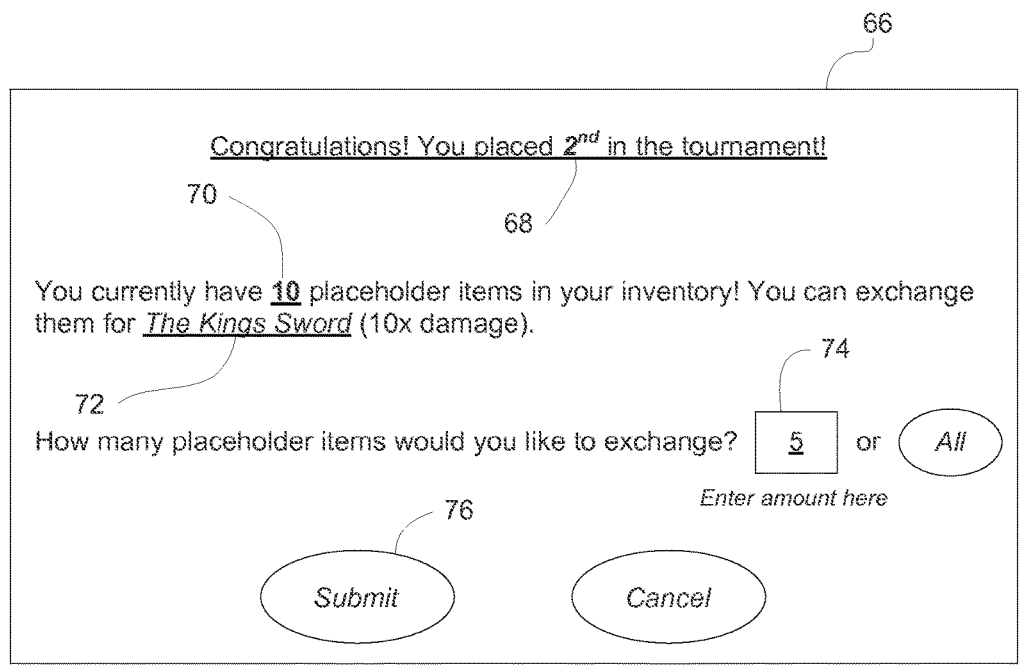
FIG. 3 illustrates an implementation of a user interface facilitating the exchange of placeholder items for virtual items of value based on a qualitative performance of the users relative to other users in events taking place in the virtual space.

In some implementations, users may be able to select the quantity of placeholder item included in their inventory they wish to exchange for virtual items of value (e.g., via a user interface such as user interface 66 shown in FIG. 3). In some implementations, the exchange of placeholder items with virtual items of value based on quantitative performance may be predetermined (e.g., via a pre-set payout schedule).

As an illustrative example in FIG. 2, subsequent to the first event 34 in the online game, the first placeholder item 42 may be exchanged in the first inventory 38 of the first user 36 for a first set of one or more virtual items. The first set may include, for example a first exchanged virtual item 62. The exchange may be determined based on quantitative performance (e.g., a rank) of the first user 36 in the first event 34 relative to other users of the virtual space and/or online game.

In some implementations, responsive to the quantitative performance of the first user 36 in the first event 34 being greater than a quantitative performance of a second user 44 in the first event 34, the first placeholder item 42 may be exchanged in the first inventory 38 of the first user 36 with the first exchanged virtual item 62 (and/or set of virtual items), and the second placeholder item 50 included in the second inventory 46 of the second user 44 may be exchanged with a second exchanged virtual item 64 (and/or set of virtual items). The quantitative performance of the first user 34 in the first event 34 may correspond to a first rank, and the quantitative performance of the second user 44 in the first event 34 may correspond to a second rank achieved in the first event, wherein the first rank is higher than the second rank. For example, if the rank of the first user 36 in the first event 34 is "$1^{st}$ place", and the rank of the second user 44 in the first event 34 is "$4^{th}$ place", then the value of the first exchanged virtual item 62 may be greater than the value of the second exchanged virtual item 64 (e.g., a premium item vs. a non-premium item, a premium item having a given value vs. a premium item of a lesser value, and/or other considerations).

In some implementations, responsive to a quantitative performance of the third user 52 in the first event 34 being less than the quantitative performance of the second user 44 (and consequently the first user 36 as well) in the first event 34, the third placeholder item 58 include in the third inventory 54 of the third user 52 (and/or any placeholder items included in a third inventory 54) may not be exchanged for virtual items of value. For example, the rank achieved by the third user 52 in the first event 34 may surpass a threshold at which placeholder items are not eligible for exchange. In some implementations, if the rank achieved by a user meets or surpasses a threshold such that placeholder items are not eligible for exchange, the placeholder items included in the give users inventory may be removed (e.g., the user may have to acquire more placeholder items for a subsequent event). In some implementations, if the rank achieved by a user meets or surpasses a threshold such that placeholder items are not eligible for exchange, the placeholder items included in the give users inventory may be kept until a quantitative performance is achieved to facilitate exchange of the placeholder items.

FIG. 3 illustrates an implementation of a user interface 66 facilitating the exchange of placeholder items for virtual items of value based on a user's quantitative performance relative to other users in events that take place in the virtual space. The user interface 66 may display the user's quantitative performance in an event (e.g., such as their rank 68). The user interface 66 may be configured to present the quantity 70 of placeholder items the users has available within their inventory. The user interface 66 may be configured to present to the user the virtual item of value 72 which can be exchanged with their placeholder items based on their quantitative performance in the event. In some implementations, the users may be able to input the quantity of placeholder items they wish to exchange, for example, via entry into a text input box 74 (e.g., via a keyed input). Other techniques for user entry and/or selection may be considered. The user interface 66 may be configured to receive user entry and/or selection to finalize the exchange of placeholder items in the user inventories with the indicated virtual item of value, for example, via a "submit" interface element 76. Finalized exchange may be facilitated by the exchange component 22 (shown in FIG. 1 and described herein).

FIG. 4 depicts an implementation of a user interface 78 configured to present a payout schedule 80 illustrating a predetermined exchange of placeholder items based on the quantitative performance of a user relative to other users in an event. In some implementations, user interface 78 may be presented as part of the shop interface as described herein. In some implementations, user interface 78 may be presented prior to, during, and/or after an event taking place in the virtual space.

It is noted that although the payout schedule 80 depicted in the user interface 78 recites items "A", "B", "C", and "D", in actuality these terms may be replaced with a name and/or description of a virtual item of value that meets the limitation of "premium" and/or "non-premium" as recited therein.

Returning to FIG. 1, the server 12, client computing platforms 28, and/or external resources 32 may be operatively linked via one or more electronic communication links. For example, such electronic communication links may be established, at least in part, via a network 26 such as the Internet and/or other networks. It will be appreciated that this is not intended to be limiting, and that the scope of this disclosure includes implementations in which servers 12, client computing platforms 28, and/or external resources 32 may be operatively linked via some other communication media.

The external resources 32 may include sources of information, hosts and/or providers of virtual spaces outside of system 10, external entities participating with system 10, external entities for player-to-player communications, and/ or other resources. In some implementations, some or all of the functionality attributed herein to external resources 32 may be provided by resources included in system 10.

The server 12 may include electronic storage 24, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 24 may comprise electronic storage media that electronically stores information. The electronic storage media of electronic storage 24 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 24 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 24 may include one or more virtual storage resources (e.g., cloud storage, a virtual private network, and/or other virtual storage resources). Electronic storage 24 may store software algorithms, information determined by processor 14, information received from server 12, information received from client computing platforms 28, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute components 16, 18, 20, 22. Processor 14 may be configured to execute components 16, 18, 20, 22 by software; hardware; firmware; some combination of software, hardware, and/or firmware; and/or other mechanisms for configuring processing capabilities on processor 14.

It should be appreciated that although components 16, 18, 20, 22 are illustrated in FIG. 1 as being co-located within a single processing unit, in implementations in which processor 14 includes multiple processing units, one or more of components 16, 18, 20, 22 may be located remotely from the other components. The description of the functionality provided by the different components 16, 18, 20, 22 described above is for illustrative purposes, and is not intended to be limiting, as any of components 16, 18, 20, 22 may provide more or less functionality than is described. For example, one or more of components 16, 18, 20, 22 may be eliminated, and some or all of its functionality may be provided by other ones of components 16, 18, 20, 22, and/or other components. As another example, processor 14 may be configured to execute one or more additional components that may perform some or all of the functionality attributed below to one of components 16, 18, 20, 22.

Figure 5:
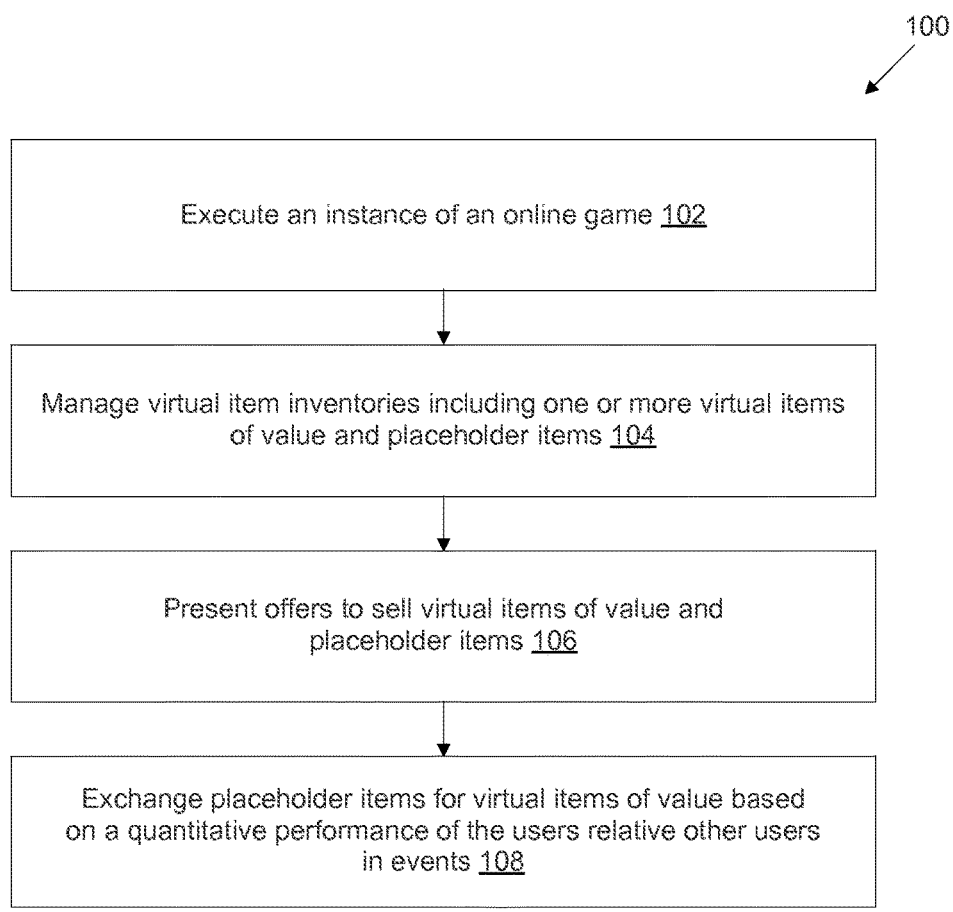
FIG. 5 illustrates a method of online gaming including placeholder items that can be exchanged for virtual items of value based on the quantitative performance of the users relative to other users in events that take place in virtual space.

FIG. 5 illustrates a method 100 of online gaming including placeholder items that can be exchanged for virtual items of value based on a quantitative performance of users relative to other users in events that take place in the online game. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 5 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/ or software to be specifically designed for execution of one or more of the operations of method 100.

Referring now to method 100 in FIG. 5, at an operation 102 an instance of an online game may be executed. The online game may take place in a virtual space. Executing the online game may include implementing the instance of the online game to facilitate user participation in the online game. Users may participate with the online game by controlling game entities in the virtual space. In some implementations, operation 102 may be performed by a game component the same as or similar to virtual game component 16 (shown in FIG. 1 and described herein).

At an operation 104, virtual item inventories including one or more virtual items available to the users in the virtual space may be managed. Virtual items inventories may include virtual items of value and virtual placeholder items acquired by users. The inventories may include a first inventory of one or more virtual items available for a first user and a second inventory of one or more virtual items available for a second user. In some implementations, operation 104 may be performed by a user component the same as or similar to the user component 18 (shown in FIG. 1 and described herein).

At an operation 106, offers to sell virtual items to users for consideration through a shop interface may be presented. The offers may include offers to sell placeholder items which can be exchanged for virtual items of value that are usable in the online game. Responsive to purchase of a first placeholder item by the first user, transfer the first placeholder item to the first inventory. In some implementations, operation 106 may be performed by a virtual shop component the same as or similar to the virtual shop component 20 (shown in FIG. 1 and described herein).

At an operation 108, the placeholder items included in the user inventories may be exchanged for virtual items that are usable in the online game based on a quantitative performance of the users relative to other users in events that take place in the online game. Subsequent to a first event in the online game, the first placeholder item may be exchanged in the first inventory of the first user for a first set of one or more virtual items determined based on quantitative performance of the first user in the first event relative to other users of the online game. In some implementations, operation 108 may be performed by an exchange component the same as or similar to the exchange component 22 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for online gaming including virtual placeholder items in an online game, wherein users can exchange the virtual placeholder items for virtual items of value based on user achievements during gameplay in the online game, wherein the users are associated with client computing platforms, wherein the users include a first user associated with a first client computing platform, the system comprising:
   one or more physical processors configured by computer-readable instructions to:
      execute an instance of the online game, and use the instance of the online game to facilitate interaction of the users with the online game through the client computing platforms that are associated with the users;
      manage inventories associated with the users in the online game, wherein the inventories include a first inventory available to the first user, wherein the first inventory includes a first placeholder item which can be exchanged, based on user achievements in the online game, for a first set of virtual items of value that are usable in the online game, and wherein the first inventory includes a second placeholder item which can be exchanged, based on user achievements in the online game, for a second set of virtual items of value that are usable in the online game;
      determine a first quantitative measure of performance achieved during gameplay in the online game, wherein the first quantitative measure of performance involved the first user;
      determine a second quantitative measure of performance achieved during gameplay in the online game, wherein the second quantitative measure of performance involved the first user; and
      exchange the first placeholder item for the first set of one or more virtual items and exchange the second placeholder item for the second set of one or more virtual items, such that:
         responsive to the first quantitative measure of performance being greater than the second quantitative measure of performance, the first set of one or more virtual items has greater value than the second set of one or more virtual items, and
         responsive to the second quantitative measure of performance being greater than the first quantitative measure of performance, the second set of one or more virtual items has greater value than the first set of one or more virtual items.

2. The system of claim 1, wherein the one or more processors are further configured to transmit game state information obtained from the instance of the game space over a network to the client computing platforms to facilitate presentation of views of the game space to the users on the client computing platforms.

3. The system of claim 1, wherein the users interact with the online game through user input received from the users through the client computing platforms during gameplay.

4. The system of claim 1, wherein the first placeholder item is associated with the first quantitative measure of performance, and wherein the second placeholder item is associated with the second quantitative measure of performance.

5. The system of claim 1, wherein the one or more processors are further configured to facilitate sales of placeholder items through a shop interface by storing account information associated with the users on electronic storage media.

6. The system of claim 1, wherein the one or more physical processors are further configured to host an event taking place in the online game, wherein the first quantitative measure of performance and the second quantitative measure of performance are determined based on gameplay during the event.

7. The system of claim 5, wherein the one or more physical processors are further configured such that offers to sell placeholder items are presented to the users via the shop interface during an event taking place in the online game, wherein a first additional quantitative measure of performance and a second additional quantitative measure of performance are determined based on gameplay during the event, and wherein the sold placeholder items are exchanged for additional sets of one or more virtual items based on the first and second additional quantitative measures of performance.

8. The system of claim 1, wherein the first quantitative measure of performance and the second quantitative measure of performance are determined based on concurrent gameplay by the first user.

9. The system of claim 8, wherein the concurrent gameplay includes one or more of a tournament and a match.

10. The system of claim 1, wherein the first quantitative measure of performance and the second quantitative measure of performance are determined based on one or more ranks achieved by the first user within the online game.

11. A method of online gaming including virtual placeholder items in an online game, wherein users can exchange the virtual placeholder items for virtual items of value based on user achievements during gameplay in the online game, wherein the users are associated with client computing platforms, wherein the users include a first user associated with a first client computing platform, the method being implemented in a computer system including one or more physical processors and storage media storing machine-readable instructions, the method comprising:
   executing an instance of the online game, and use the instance of the online game to facilitate interaction of the users with the online game through the client computing platforms that are associated with the users;
   managing inventories associated with the users in the online game, wherein the inventories include a first inventory available to the first user, wherein the first inventory includes a first placeholder item which can be exchanged, based on user achievements in the online game, for a first set of virtual items of value that are usable in the online game, and wherein the first inventory includes a second placeholder item which can be exchanged, based on user achievements in the online game, for a second set of virtual items of value that are usable in the online game;

determining a first quantitative measure of performance achieved during gameplay in the online game, wherein the first quantitative measure of performance involved the first user;

determine a second quantitative measure of performance achieved during gameplay in the online game, wherein the second quantitative measure of performance involved the first user; and exchanging the first placeholder item for the first set of one or more virtual items and exchanging the second placeholder item for the second set of one or more virtual items, such that:

responsive to the first quantitative measure of performance being greater than the second quantitative measure of performance, the first set of one or more virtual items has greater value than the second set of one or more virtual items, and further such that:

responsive to the second quantitative measure of performance being greater than the first quantitative measure of performance, the second set of one or more virtual items has greater value than the first set of one or more virtual items.

12. The method of claim 11, further comprising:
transmitting game state information obtained from the instance of the game space over a network to the client computing platforms to facilitate presentation of views of the game space to the users on the client computing platforms.

13. The method of claim 11, wherein the users interact with the online game through user input received from the users through the client computing platforms during gameplay.

14. The method of claim 11, wherein the first placeholder item is associated with the first quantitative measure of performance, and wherein the second placeholder item is associated with the second quantitative measure of performance.

15. The method of claim 11, further comprising:
facilitating sales of placeholder items through a shop interface by storing account information associated with the users on electronic storage media.

16. The method of claim 11, further comprising:
hosting an event taking place in the online game, wherein the first quantitative measure of performance and the second quantitative measure of performance are determined based on gameplay during the event.

17. The method of claim 15, wherein offers to sell placeholder items are presented to users via the shop interface during an event taking place in the online game, wherein a first additional quantitative measure of performance and a second additional quantitative measure of performance are determined based on gameplay during the event, the method further comprising:
exchanging the sold placeholder items for additional sets of one or more virtual items based on the first and second additional quantitative measures of performance.

18. The method of claim 11, wherein the first quantitative measure of performance and the second quantitative measure of performance are determined based on concurrent gameplay by the first user.

19. The method of claim 18, wherein the concurrent gameplay includes one or more of a tournament and a match.

* * * * *